(12) United States Patent
Masumoto

(10) Patent No.: US 9,986,122 B2
(45) Date of Patent: May 29, 2018

(54) IMAGE FORMING APPARATUS, NOTIFICATION METHOD, COMPUTER-READABLE RECORDING MEDIUM STORING PROGRAM, AND IMAGE FORMING SYSTEM

(71) Applicant: KONICA MINOLTA, INC., Chiyoda-ku, Tokyo (JP)

(72) Inventor: Kosuke Masumoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/355,840

(22) Filed: Nov. 18, 2016

(65) Prior Publication Data

US 2017/0155793 A1   Jun. 1, 2017

(30) Foreign Application Priority Data

Nov. 26, 2015   (JP) ................. 2015-230334

(51) Int. Cl.
| | | |
|---|---|---|
| *G06F 15/00* | (2006.01) | |
| *H04N 1/32* | (2006.01) | |
| *G06F 3/12* | (2006.01) | |
| *H04N 1/44* | (2006.01) | |

(52) U.S. Cl.
CPC ....... *H04N 1/32117* (2013.01); *G06F 3/1222* (2013.01); *G06F 3/1238* (2013.01); *G06F 3/1288* (2013.01); *H04N 1/32507* (2013.01); *H04N 1/444* (2013.01); *H04N 2201/0039* (2013.01); *H04N 2201/0055* (2013.01); *H04N 2201/0094* (2013.01); *H04N 2201/3205* (2013.01); *H04N 2201/3221* (2013.01)

(58) Field of Classification Search
CPC .......... H04N 1/32117; H04N 1/32507; H04N 1/444; G06F 3/1238; G06F 3/1288
USPC ....................................... 358/1.14
See application file for complete search history.

(56) References Cited

U.S. PATENT DOCUMENTS

2003/0103790 A1*   6/2003   Murase ............... B41J 29/18
400/76

FOREIGN PATENT DOCUMENTS

| JP | 2010135993 A | 6/2010 |
|---|---|---|
| JP | 2011041132 A | 2/2011 |
| JP | 2016150505 A | 8/2016 |

OTHER PUBLICATIONS

Machine translation of Japanese Patent DOcument No. 2011-041132, Ohashi, Feb. 24, 2011.*

(Continued)

*Primary Examiner* — Mark R Milia
(74) *Attorney, Agent, or Firm* — Holtz, Holtz & Volek PC

(57) ABSTRACT

When other user is using an image forming apparatus before an output-permitted user having issued a security job reaches the image forming apparatus, security is lowered and also it takes some time until processing of security job is completed. The image forming apparatus notifies the output-permitted user of information indicating that other user is using the image forming apparatus in a case where the other user present near the image forming apparatus (own apparatus) is using the image forming apparatus. With this arrangement, the output-permitted user can know whether or not the other user is using the image forming apparatus before the output-permitted user reaches the image forming apparatus.

17 Claims, 8 Drawing Sheets

(56) References Cited

OTHER PUBLICATIONS

Japanese Office Action dated Jan. 9, 2018 issued in counterpart Japanese Application No. 2015-230334.

* cited by examiner

| NUMBER OF JOBS | START-UP DISTANCE |
|---|---|
| ONE | 0.5m |
| TWO | 1m |
| THREE | 1.5m |
| FOUR | 2m |

| MANAGEMENT NUMBER | JOB TYPE | START-UP DISTANCE |
|---|---|---|
| FN1 | SHEET FOLDING | 2m |
| FN2 | CUTTING | 1m |
| FN3 | STAPLING | 0.5m |
| FN4 | BOOKBINDING | 3m |

FIG. 6B

| COMBINATION OF JOB TYPES | TOTAL DISTANCE |
|---|---|
| SHEET FOLDING + CUTTING + STAPLING + BOOKBINDING | 6.5m |

FIG. 6C

| COMBINATION OF JOB TYPES | TOTAL DISTANCE |
|---|---|
| SHEET FOLDING + CUTTING + STAPLING | 3.5m |
| SHEET FOLDING + CUTTING + BOOKBINDING | 6m |
| SHEET FOLDING + STAPLING + BOOKBINDING | 5.5m |
| CUTTING + STAPLING + BOOKBINDING | 4.5m |

FIG. 6D

| COMBINATION OF JOB TYPES | TOTAL DISTANCE |
|---|---|
| SHEET FOLDING + CUTTING | 3m |
| SHEET FOLDING + STAPLING | 2.5m |
| SHEET FOLDING + BOOKBINDING | 5m |
| CUTTING + STAPLING | 1.5m |
| CUTTING + BOOKBINDING | 4m |
| STAPLING + BOOKBINDING | 3.5m |

1

IMAGE FORMING APPARATUS, NOTIFICATION METHOD, COMPUTER-READABLE RECORDING MEDIUM STORING PROGRAM, AND IMAGE FORMING SYSTEM

BACKGROUND OF THE INVENTION

Field of the Invention

The present invention relates to an image forming apparatus that, for example, starts printing of a print job issued by a user when the user comes near the image forming apparatus, a notification method, a computer-readable recording medium storing a program, and an image forming system.

Description of the Related Art

There is an image forming apparatus having a security printing function for preventing information leakage caused when a printed matter output onto a document receiving tray is taken away or peeped by a stranger. According to the image forming apparatus, an output-permitted user that permits execution of printing related to the print job is previously set for the print job. When an authentication device belonging to the image forming apparatus authenticates the output-permitted user, the image forming apparatus starts printing related to the print job, and thus security can be enhanced. As described above, the print job in which the output-permitted user causes the image forming apparatus to perform security printing is referred to as "security job."

Conventionally, in order to ensure the security in the printing by the security job, the output-permitted user performs an authentication action in front of the image forming apparatus. There has been used, as the authentication action, for example, a method for causing a card reader belonging to the image forming apparatus to read privacy identification information of an IC card held by the output-permitted user. As described above, since the output-permitted user is authenticated in front of the image forming apparatus, the image forming apparatus can perform the printing on the basis of the security job in a state where the output-permitted user is present in front of the image forming apparatus. Since the output-permitted user can easily take out the printed matter having high security, there can be prevented a problem that the printed matter passes into the hands of a user other than the output-permitted user.

However, the output-permitted user needs to wait in front of the image forming apparatus until the printing based on the security job is completed. This is because, when the other user is present near the image forming apparatus, the security is impaired as soon as the printed matter is ejected onto a document receiving tray. Furthermore, since the image forming apparatus starts the printing based on the security job from a time point when the authentication device authenticates the output-permitted user, printing time required until the printing is finished becomes longer, and waiting time for waiting for completing the printing in front of the image forming apparatus becomes longer, thereby resulting in lowering convenience.

In order to shorten the waiting time of the output-permitted user, there is, for example, a method in which the output-permitted user having approached the image forming apparatus by a predetermined distance through the utilization of radio or the like remotely logs in the image forming apparatus. Even when the output-permitted user is present at a place away from the image forming apparatus, the image forming apparatus automatically starts the printing based on the security job issued by the output-permitted user by remote log-in. Then, at a time point when the output-permitted user reaches the image forming apparatus, the printing of the security job has completed to some extent, and thus the waiting time of the output-permitted user becomes shortened. As described above, techniques disclosed in Patent Literatures 1 and 2 as below are known as a technique of the output-permitted user remotely logging in.

The Patent Literature 1 discloses a technique for starting display on a display screen when it is detected that an identification information transmitting apparatus held by the user has entered within a predetermined distance.

The Patent Literature 2 discloses a technique for determining a warming-up start distance on the basis of a typical walking speed of human being and a warming-up time required for preparing image formation by using a composite machine.

RELATED ART DOCUMENT

Patent Document

Patent Literature 1: Japanese Patent Laid-Open Publication No. 2011-41132

Patent Literature 2: Japanese Patent Laid-Open Publication No. 2010-135993

DISCLOSURE OF THE INVENTION

Problems to be Solved by the Invention

Incidentally, when another user (can be a plurality of users) is present near the image forming apparatus, the output-permitted user approaching the image forming apparatus cannot know whether or not the other user is using the image forming apparatus. When the other user is using the image forming apparatus, even if the output-permitted user reaches the image forming apparatus, the output-permitted user needs to wait until the other user completes the use of the image forming apparatus. Furthermore, when the other user is present near the image forming apparatus, the other user can visually recognize the printed matter if the output-permitted user remotely logs in to thereby automatically start the printing on the basis of the security job, whereby the security is lowered.

Even when the techniques about remotely logging in the image forming apparatus described in the Patent Literatures 1 and 2 are used, the output-permitted user having approached the image forming apparatus cannot know the timing for completing the printing by a normal job issued by the other user. Therefore, even when the output-permitted user reaches the image forming apparatus, the waiting time of the output-permitted user is not reduced since the printing on the basis of the security job is not started or the printing is not completed.

The present invention has been made in view of the above described situation, and an object of the present invention is to reduce the waiting time of the output-permitted user when the other user is present near the image forming apparatus.

SUMMARY OF THE INVENTION

Means for Solving the Problem

In order to realize at least one of the above described objects, the image forming apparatus on which one aspect of the present invention is reflected includes an image forming unit forming an image on a sheet on the basis of a print job issued from a communication terminal operated by a user and a hardware processor.

The hardware processer: acquires the print job; detects the user present in a detectable region; acquires determination information for determining whether the user is an output-permitted user having issued the print job or is other user except for the output-permitted user; causes the image forming unit to form the image based on the print job in a case where the output-permitted user has reached a processing start region where the image forming unit becomes capable of starting forming the image; and notifies the output-permitted user of information indicating that the other user is using the own apparatus in a case where the other user present near an own apparatus is using the own apparatus.

Note that the above described image forming apparatus is one aspect of the present invention. The method and the image forming system reflecting the one aspect of the present invention, and a program being stored in a computer-readable recording medium and reflecting one aspect of the present invention also have similar configurations to the image forming apparatus reflecting the one aspect of the present invention.

BRIEF DESCRIPTION OF THE DRAWINGS

FIG. 5 is a configuration diagram of the number-of-jobs-and distance-converting table according to the embodiment of the present invention.

FIG. 6A is a configuration diagram of a job type- and distance-converting table according to the embodiment of the present invention.

FIG. 6B is an explanation diagram illustrating an example of a total distance acquired by combining four job types.

FIG. 6C is an explanation diagram illustrating an example of total distances acquired by combining three job types.

FIG. 6D is an explanation diagram illustrating an example of total distances acquired by combining two job types.

DESCRIPTION OF THE PREFERRED EMBODIMENTS

Figure 1:
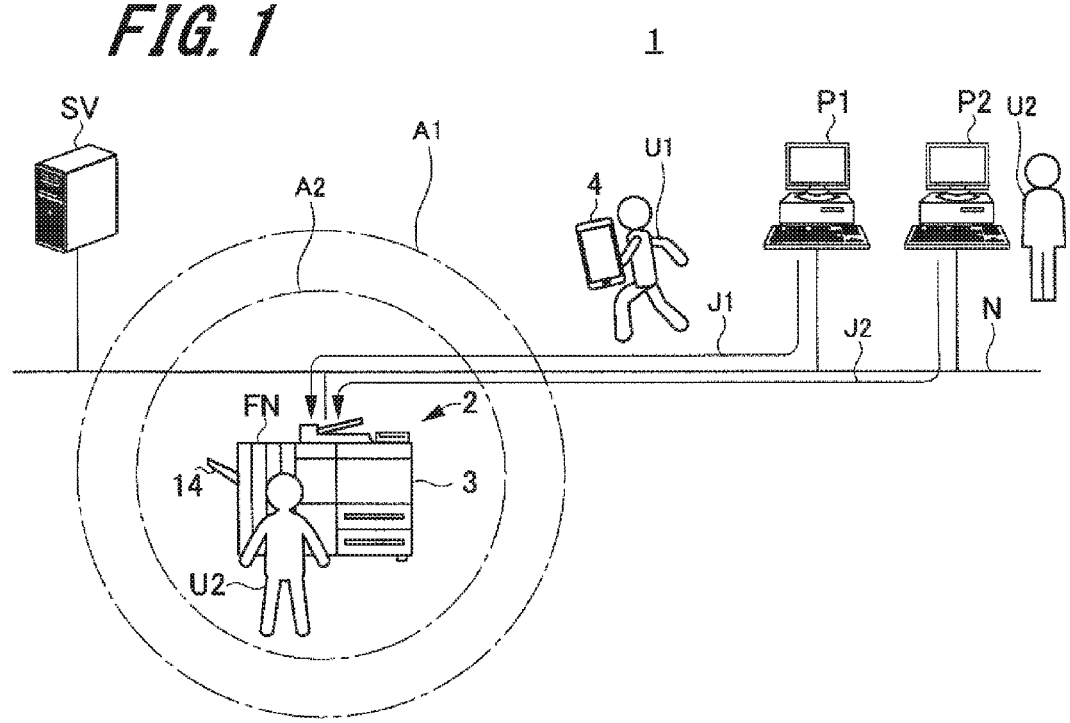
FIG. 1 is a schematic view illustrating a configuration example of an image forming system according to an embodiment of the present invention.

An embodiment of the present invention will be described below by referring to the attached drawings. In the description and the drawings, the same reference numerals are attached to constituent elements having substantially the same functions or configurations, and thus duplicated explanation is omitted.

Embodiment

<Schematic Configuration Example of Image Forming System>

FIG. 1 is a schematic view illustrating a configuration example of an image forming system 1 according to an embodiment.

Figure 2:
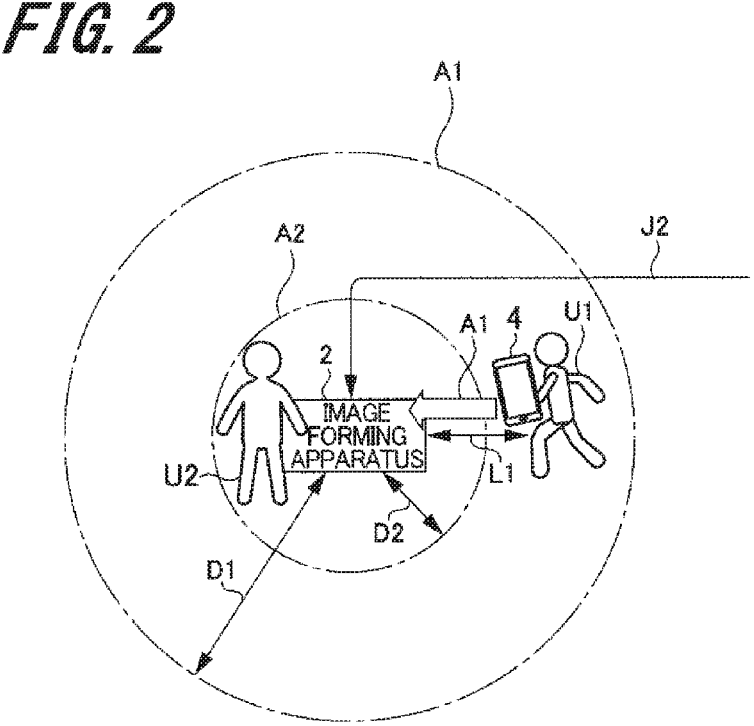
FIG. 2 is an explanation diagram illustrating an example of a user detection distance in a detectable region, a start-up distance of a start-up region, and a user distance according to the embodiment of the present invention.

FIG. 2 illustrates an example of a user detection distance D1 of a detectable region A1, a start-up distance D2 of a start-up region A2, and a user distance L1.

The image forming system 1 includes an image forming apparatus 2, PC (personal computer) terminals P1 and P2, a job sorting server SV, and a terminal device 4 held by an output-permitted user U1. The image forming apparatus 2 is connected to each of the pc terminals P1 and P2 through network N such as a wireless or wired LAN (local area network).

The PC terminal P1 (example of a communication terminal) is operated by the output-permitted user U1 issuing a security job J1. The security job J1 refers to a print job on which utilization of a security printing function is set. The security job J1 is not performed by the image forming apparatus 2 without log-in authentication of the output-permitted user U1. Accordingly, after the output-permitted user U1 remotely logs in the image forming apparatus 2, the print processing of the security job J1 is started by the image forming apparatus 2. In description below, the output-permitted user U1 having issued the security job J1 is referred to as an owner of the security job J1. The security job J1 includes an owner ID that coincides with a user ID (example of user identification information) of the output-permitted user U1. Furthermore, the print processing includes image forming processing by an image forming apparatus main body 3 and post processing by a post processing device FN, but the image forming processing alone is also referred to as the print processing.

The PC terminal P2 (example of a communication terminal) is operated by other user U2 issuing a normal job J2. The normal job J2 is a print job in which the print processing is performed by the image forming apparatus 2 even if the log-in authentication is not performed for the other user U2. Accordingly, as soon as the normal job J2 is issued by the pc terminal P2, the print processing is performed by the image forming apparatus 2. The other user U2 having issued the normal job J2 is referred to as an owner of the normal job J2. The normal job J2 also includes the owner ID that coincides with a user ID of the other user U2.

In the descriptions below, when the security job J1 and the normal job J2 are not distinguished from each other, they are referred to as a "print job". Note that the processing using a scanning function, a copy function, and the like the image forming apparatus 2 has is also assumed to be included in the print job.

A job sorting server SV sorts the print jobs issued by the pc terminals P1 and P2 to a specific image forming apparatus 2 of a plurality of image forming apparatuses 2. For example, there is assumed a case where, after the output-permitted user U1 issues the security job J1 without specifying the image forming apparatus 2, the output-permitted user U1 approaches any image forming apparatus 2 of the plurality of image forming apparatuses 2. At this point, the job sorting server SV sorts the security job J1 to the image forming apparatus 2 which the output-permitted user U1 approaches. With this arrangement, the output-permitted user U1 can acquire a sheet (also referred to as "printed matter") on which an image is formed on the basis of the security job J1 from the image forming apparatus 2 which the output-permitted user U1 approaches.

Note that, when the output-permitted user U1 specifies the specific image forming apparatus 2, the job sorting server SV sorts the security job J1 only to the image forming apparatus 2 specified. In this case, the image forming processing on the basis of the security job J1 is not performed on the image forming apparatus 2 other than the specific image forming apparatus 2 specified by the output-permitted user U1.

The image forming apparatus 2 includes the image forming apparatus main body 3 forming the image on the sheet, and the post processing device FN (an example of the post processing section) performing a predetermined post processing on the printed matter ejected from the image forming apparatus main body 3. The detailed configuration example and processing example of the image forming apparatus main body 3 and the post processing device FN will be described below. The printed matter which has ejected from the image forming apparatus main body 3 and on which the post processing is performed by the post processing device FN is ejected to a document receiving tray 14. The output-permitted user U1 and the other user U2 can acquire the printed matter ejected onto the document receiving tray 14. Note that, when the post processing device FN is not provided on the image forming apparatus 2, the document receiving tray 14 is mounted on the image forming apparatus main body 3.

The terminal device 4 includes a smart device such as a smart phone and a tablet, and a portable terminal device of the portable phones, owned and used by each user. The terminal device 4 mutually communicates with a wireless communication section 35 (refer to FIG. 4 described below) of the image forming apparatus main body by communication connection of short-distance wireless communication using Bluetooth (registered trademark), WiFi (registered trademark) and the like. For example, the terminal device 4 wirelessly transmits the user ID and the like for identifying a user to the wireless communication section 35, which wirelessly receives user identifying information from the terminal device 4.

A detectable region A1 in a substantially circular shape and a start-up region A2 are set for the image forming apparatus 2, with the image forming apparatus 2 as a center. Here, a distance from the document receiving tray 14 of the image forming apparatus 2 to the output-permitted user U1 (terminal device 4) is expressed as a user distance L1. Note that the user distance L1 may not be limited to the document receiving tray 14 but may be a distance from an arbitrary position of the image forming apparatus 2 to the output-permitted user U1 (terminal device 4).

The detectable region A1 is a region in a substantially circular shape having a user detection distance D1 illustrated in FIG. 2 as a radius, with the image forming apparatus 2 as a center. The user detection distance D1 enables the user detection section 17 (refer to FIG. 4 described below) of the image forming apparatus main body 3 to detect that the output-permitted user U1 or the other user U2 has approached the image forming apparatus 2. Whether or not the output-permitted user U1 or the other user U2 is present within the detectable region A1 is determined by whether or not the user distance L1 of the output-permitted user U1 or the other user U2 is less than the user detection distance D1.

The start-up region A2 is a region in a substantially circular shape having the start-up distance D2 (an example of the processing start distance) as a radius, with the image forming apparatus 2 as a center (for example, document receiving tray 14). The start-up distance D2 is a distance at which the printing according to the print job is allowed to start and the distance is used as one example of the processing start distance, if the security on the printed matter ejected onto the document receiving tray 14 is ensured, in a case where the output-permitted user U1 authenticated to log in approaches the image forming apparatus 2. When the output-permitted user U1 approaches the start-up distance D2 with respect to the image forming apparatus 2 and enters the start-up region A2, the image forming apparatus 2 changes its mode from a power saving mode to an image forming mode and starts up. Whether or not the output-permitted user U1 is present within the start-up region A2 is determined by whether or not the user distance L1 of the output-permitted user U1 is less than the start-up distance D2.

When the output-permitted user U1 enters within the start-up region A2, the output-permitted user U1 remotely logs in the image forming apparatus 2 and starts up the image forming apparatus 2. Subsequently, the image forming apparatus 2 starts the print processing based on the security job J1.

The image forming apparatus 2 changes the start-up distance D2 in accordance with the number of pages to be printed by the print job, the number of copies, a print speed of the image forming apparatus 2 and the like. The start-up distance D2 set at a time point when the output-permitted user U1 reaches the user detection distance D1 has a different value from that of the user detection distance D1, but may have the same value.

Here, there is assumed a case where the other user U2 is working near the image forming apparatus 2 when the output-permitted user U1 having issued the security job J1 enters the detectable region A1. Whether or not the other user U2 has issued the normal job J2 is not a problem. The other user U2 operates an operation panel 6 (refer to FIG. 4 described below) of the image forming apparatus 2 without remotely logging in and utilizes the scanning function, the copy function or the like of the image forming apparatus 2 or performs a preparation work. However, the other user U2 present near the image forming apparatus 2 may be in a state of being authenticated to log in the image forming apparatus 2. As described above, when the other user U2 is present near the image forming apparatus 2, the printed matter printed on the basis of the security job J1 may be visually recognized by the other user U2, or may be taken away. Accordingly, there is proposed a method for notifying the terminal device 4 of information indicating use condition of the other user U2 from the image forming apparatus 2, to thereby notify the output-permitted user U1 of the use condition of the other user U2 and reduce a waiting time of the output-permitted user U1.

Hereinafter, a specific configuration example of the image forming apparatus 2 will be described.

<Configuration Example of Hardware of Image Forming Apparatus>

Next, a configuration example of hardware of the image forming apparatus 2 will be described.

Figure 3:
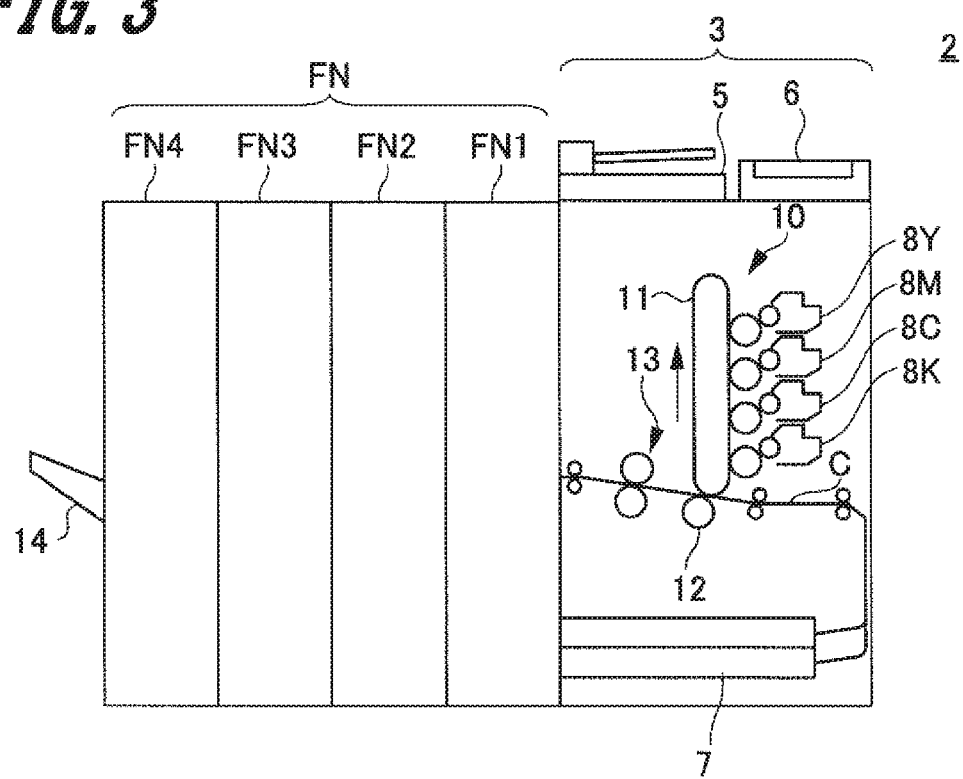
FIG. 3 is a configuration diagram of hardware of an image forming apparatus according to the embodiment of the present invention.

FIG. 3 is a configuration diagram of the hardware of the image forming apparatus 2.

The image forming apparatus 2 includes the image forming apparatus main body 3 and the post processing device FN.

The image forming apparatus main body 3 adopts an electrophotographic method for forming an image by using static electricity, and color printing can be performed by overlapping toner images of, for example, four colors of yellow Y, magenta M, cyan C, and black K. The image forming apparatus main body 3 has an auto document feeder (ADF) 5, an operation panel 6, a sheet feeding section 7, an image forming section 10, an intermediate transfer belt 11 (image carrying member), a secondary transfer section 12, and a fixing section 13.

The auto document feeder 5 automatically feeds a document when reading the document. A scanner 45 (refer to FIG. 4 described below) included in the auto document feeder 5 can read the image of the document placed on platen glass of an upper portion of the image forming apparatus main body 3, and also the image on the document automatically conveyed by the auto document feeder 5.

The operation panel 6 has a function as an operation section 41 (refer to FIG. 4 described below) directing the start of the job such as the image forming processing. A liquid crystal display (LCD) is disposed on the operation panel 6. The LCD includes a touch panel, and an operation performed by the output-permitted user U1 or the other user U2 and display of various information can be displayed. The LCD serves as both an operation section 41 and a display section 42 illustrated in FIG. 4 described below. It is also possible that the operation section 41 can include a mouse, a tablet and the like, also in a separate body as a display section 42.

The sheet feeding section 7 includes a plurality of sheet storage sections in accordance with sizes and types of the sheets. In the sheet feeding section 7, a sheet is taken out from the sheet storage section and is sent to a conveyance passage C, by selection of a corresponding sheet storage section on the basis of a direction from the image forming apparatus main body 3.

An image forming section 10 includes four image forming units 8Y, 8M, 8C, and 8K in order to form a toner image of each color of Y, M, C, and K. The image forming section 10 controls actions of the image forming units 8Y, 8M, 8C, and 8K of the image forming section 10 to form the toner image of each color of Y, M, C, and K. Furthermore, the image forming apparatus main body 3 includes a plurality of rollers (conveyance rollers) for conveying the sheet to the conveyance passage C. The rollers normally include paired rollers.

In the image forming mode, the image forming apparatus main body 3 charges photoreceptors the image forming units 8Y, 8M, 8C, and 8K have, and also erases electric charges after exposure to the photoreceptors to thereby form static latent images thereon. Then, toner is caused to adhere onto the static latent image of the photoreceptor of each color of Y, M, C, and K by using a development section to thereby form the toner image of each color. The toner image formed on the photoreceptor of each color of Y, M, C, and K is sequentially subjected to primary transfer onto a front surface of the intermediate transfer belt 11 rotating in an arrow direction.

Subsequently, the tonner image of each color subjected to primary transfer onto the intermediate transfer belt 11 by the secondary transfer section 12 (secondary transfer roller) is subjected to secondary transfer onto the sheet that is supplied from the sheet feeding section 7, and that is conveyed by the roller. The toner image of each color on the intermediate transfer belt 11 is subjected to secondary transfer onto the sheet to thereby form a color image. The image forming apparatus main body 3 conveys the sheet on which the color toner image is formed, to a fixing section 13.

The fixing section 13 performs fixing processing on the sheet on which the color toner image is formed. The fixing section 13 presses and heats up the conveyed sheet and fixes the transferred toner image onto the sheet. The fixing section 13 includes, for example, an upper fixing roller and a lower fixing roller (not illustrated) which are fixing members. The upper fixing roller and the lower fixing roller are arranged in a state of being brought into pressure contact with each other, and a fixing nip section is formed as a pressure contact section between the upper fixing roller and the lower fixing roller.

A heating section (not illustrated) is provided inside the upper fixing roller. Radiation heat from the heating section warms up a roller section disposed at an outer peripheral section of the upper fixing roller. The sheet is conveyed to the fixing nip section such that a face (object fixed face) on which the toner image is transferred by the secondary transfer section 12 faces the upper fixing roller. The sheet passing through the fixing nip section is pressed by the upper fixing roller and the lower fixing roller, and is then heated up with heat of the roller section of the upper fixing roller. The sheet on which the fixing processing has been performed by the fixing section 13 is ejected to the post processing device FN.

The post processing device FN includes, for example, a sheet folding device FN1, a cutting device FN2, a stapling device FN3, and a bookbinding device FN4.

The sheet folding device FN1 performs sheet folding processing on a sheet conveyed from the image forming apparatus main body 3 as necessary, and then, ejects the sheet to a following cutting device FN2. Specifically, when execution of the sheet folding processing is set for the print job, the sheet folding device FN1 ejects the sheet to the cutting device FN2 after performing folding processing. On the other hand, when execution of the sheet folding processing is not set for the print job, the sheet folding device FN1 ejects the sheet to the cutting device FN2 as it is without performing the sheet folding processing.

The cutting device FN2 performs cutting processing on the sheet conveyed from the sheet folding device FN1 as necessary, and then, ejects the sheet to a following stapling device FN3. Specifically, when execution of the cutting processing is set for the print job, the cutting device FN2 ejects the sheet to the stapling device FN3 after performing the cutting processing. On the other hand, when execution of the cutting processing is not set for the print job, the cutting device FN2 ejects the sheet to the stapling device FN3 as it is without performing the cutting processing.

The stapling device FN3 performs stapling processing on the sheet conveyed from the cutting device FN2 as necessary, and then, ejects the sheet to a following bookbinding device FN4. Specifically, when execution of the stapling processing is set for the print job, the stapling device FN3 ejects the sheet to the bookbinding device FN4 after performing the stapling processing. On the other hand, when execution of the stapling processing is not set for the print job, the stapling device FN3 ejects the sheet to the bookbinding device FN4 as it is without performing the staple processing.

The bookbinding device FN4 performs bookbinding processing on the sheet conveyed from the stapling device FN3 as necessary, and then, ejects the sheet to the document receiving tray 14. More specifically, when execution of the bookbinding processing is set for the print job, the bookbinding device FN4 ejects the sheet to the document receiving tray 14 after performing the bookbinding processing. On the other hand, when execution of the bookbinding processing is not set for the print job, the bookbinding device FN4 ejects the sheet the sheet to the document receiving tray 14 as it is without performing the bookbinding processing.

Note that the present embodiment describes the image forming apparatus 2 forming the color image as an example, but the image forming apparatus forming a monochrome image may be also used.

<Schematic Configuration Example of Image Forming Apparatus Main Body>

Subsequently, a schematic configuration example of the image forming apparatus main body 3 will be described.

Figure 4:
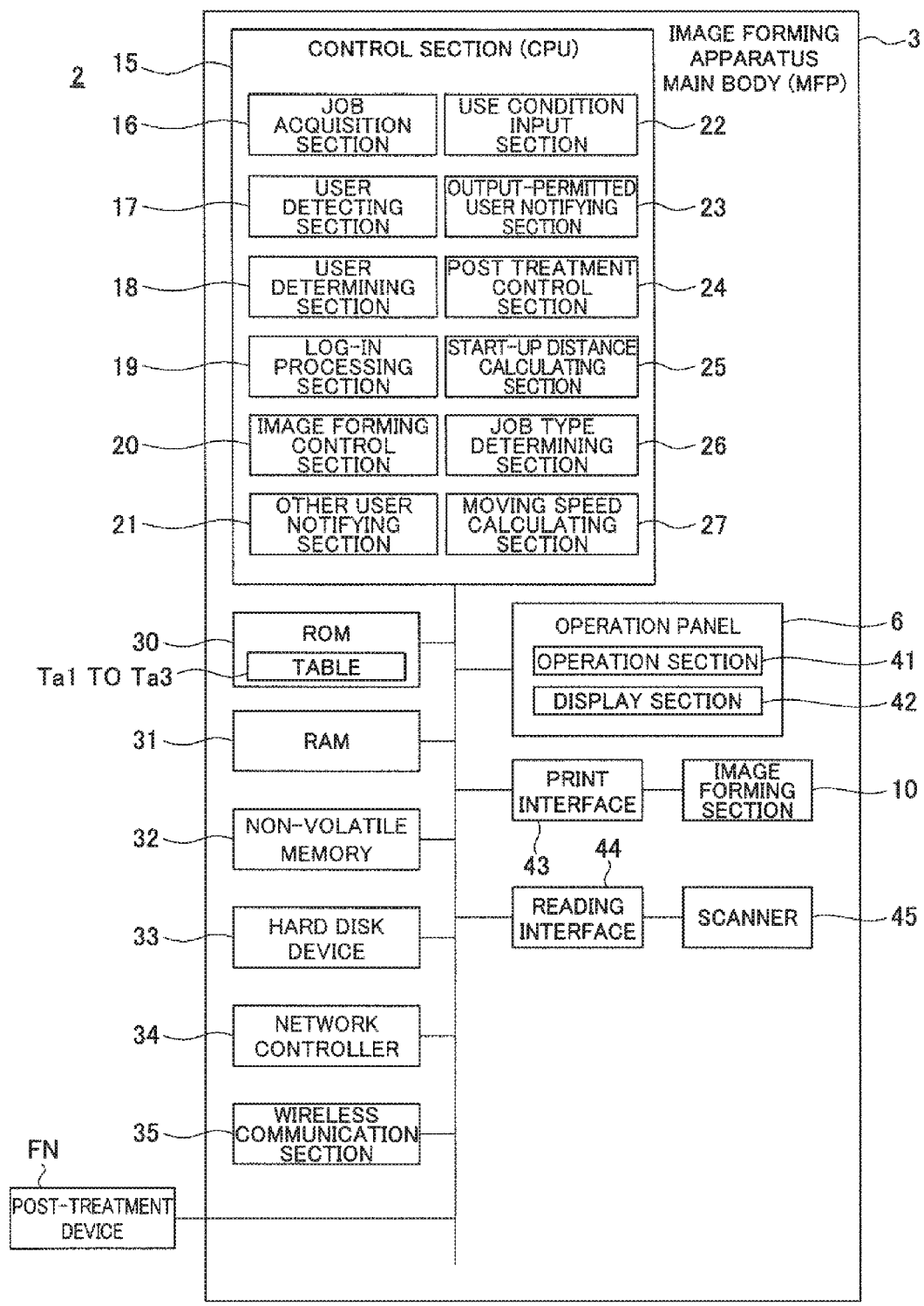
FIG. 4 is a block diagram illustrating a schematic configuration of an image forming apparatus main body according to the embodiment of the present invention.

FIG. 4 is a block diagram illustrating a schematic configuration of the image forming apparatus main body 3.

The image forming apparatus main body 3 is a so-called multi-function printer (MFP) including a copy function, a scanning function, a printing function, and the like. The copy function is a function for optically reading and printing a copied image on a sheet. The scanning function is a function for storing read image data of the document in a file, and transmitting the image data to the pc terminals P1 and P2 via a network N. The printing function is a function for printing and outputting a document and an image on a sheet on the basis of a print job received from an outside through the network N.

The image forming apparatus main body 3 stores the print job input from the PC terminals P1 and P2. Then, when the output-permitted user U1 enters the start-up region A2, printing of the print job automatically starts, and thus the security of the printed matter ejected onto the document receiving tray 14 can be ensured.

The image forming apparatus main body 3 includes a control section 15 comprehensively controlling actions by the image forming apparatus main body 3. The control section 15 executes various types of processing by a central processing unit (CPU). The CPU is used as one example of hardware processors for controlling actions of each section in the image forming apparatus 2. The control section 15 is connected with a read only memory (ROM) 30, a random access memory (RAM) 31, a non-volatile memory 32, a hard disk device 33, a network controller 34, a wireless communication section 35, an operation panel 6, a print interface 43, a reading interface 44 and the like. The print interface 43 is connected with an image forming section 10. The reading interface 44 is connected with a scanner 45.

The control section 15 is based on an operating system (OS) program, and executes programs such as middleware and application programs on the basis of the OS program. Processing of each section executed by the control section 15 will be described below.

The ROM 30 stores various types of programs. The control section 15 executes the processing according to the program to thereby realize each function of the image forming apparatus main body 3. Furthermore, the ROM 30 stores the number-of-jobs-and distance-converting table Ta1 illustrated in FIG. 5 described below, a job type-and distance-converting table Ta2 illustrated in FIG. 6, and a radio-wave strength-and distance-converting table Ta3 corresponding to a characteristics graph illustrated in FIG. 7. Moreover, the ROM 30 stores user IDs, passwords, and the like.

The RAM 31 is used as a work memory temporarily storing various types of data when the control section 15 executes a program. Furthermore, the RAM 31 temporarily stores the print job acquired by the job acquisition section 16.

The non-volatile memory 32 stores various types of settings.

The hard disk device 33 stores the print job or the like received by the network controller 34.

The ROM 30 records the programs and data required for the CPU to act. The ROM 30 is used as one example of a computer-readable and non-transient recording medium that stores the program to be executed by the CPU, and the ROM 30 permanently stores the program. Note that the computer readable and non-transient recording medium that stores the program to be executed by the CPU is not limited to the ROM 30. For example, the non-volatile memory 32 and the hard disk device 33 may also be used, and recording mediums such as CD-ROM, DVD-ROM may also be used.

The network controller 34 receives the print job from the PC terminals P1 and P2 through the network N by the control of the job acquisition section 16.

The wireless communication section 35 performs mutual communication with the terminal device 4 by the communication connection of the short distance wireless communication using Bluetooth, WiFi and the like as described above. In addition, the wireless communication section 35 can measure strength of radio wave (strength of received signals) through which the terminal device 4 transmits the user IDs. The strength of the radio waves measured by the wireless communication section 35 is transmitted to a user detection section 17 in the control section 15.

The operation panel 6 includes an operation section 41 and a display section 42.

The operation section 41 includes various types of operation switches such as a start button, a touch panel provided on a display face of the display section 42 and the like. The touch panel detects a coordinate position pressed with a touch pen, a finger or the like. Furthermore, the touch panel detects a flick operation, a drag operation, an operation corresponding to a scroll bar and the like.

The display section 42 includes a liquid crystal display (LCD) and the like, and has a function for displaying various types of operation screens, setting screens and the like.

The print interface 43 is connected with the image forming section 10.

The image forming section 10 performs image forming processing for forming an image on a sheet on the basis of the print job acquired by the job acquisition section 16 under control of the image forming control section 20.

The reading interface 44 is connected with the scanner 45 having a function for optically reading the document and acquiring the image data. The scanner 45 is constituted by including, for example, a linear image sensor, a movable unit, an optical passage, and a conversion section. The line image sensor reads one line of the document in a width direction when receiving light with which a light source irradiates the document and its reflection light. The movable unit sequentially moves a reading position by a line unit in a length direction of the document. The optical passage includes a lens and a mirror which guide the reflection light from the document to the line image sensor to thereby form an image. The conversion section converts an analog image signal output from the linear image sensor into digital image data.

Here, a configuration example of each section included in the control section 15 will be described.

The job acquisition section 16 controls the network controller 34 to thereby acquire the print job transmitted from the pc terminals P1 and P2, through the network controller 34.

The wireless communication section 35 performs the short distance wireless communication with the terminal device 4, and then, the user detection section 17 detects the terminal device 4 held by a user existing within the detectable region A1. In addition, the user detection section 17 calculates a user distance L1 (refer to FIG. 2) with reference to the radio-wave strength-and distance-converting table Ta3 stored in the ROM 30, on the basis of the strength of received signal of the radio wave that is measured by the wireless communication section 35 and transmitted by the terminal device 4.

Note that the user detection section 17 may detect an orientation and an absolute position of latitude and longitude of the user with respect to the image forming apparatus 2.

A user determination section 18 determines on the basis of user information received from the terminal device 4 by the wireless communication section 35 whether or not the user within the detectable region A1 detected by the user detection section 17 is the output-permitted user U1 having issued the security job J1 or the user is the other user U2. However, if the other user U2 present near the image forming apparatus 2 does not hold the terminal device 4, the wireless communication section 35 cannot receive the user information from the terminal device 4. In that case, the user determination section 18 determines that the user detected by the user detection section 17 is the other user U2.

A log-in processing section 19 (example of an authentication section) performs log-in authentication of the output-permitted user U1 determined by the user determination section 18. The log-in processing section 19 can perform the log-in authentication on the output-permitted user U1 by remotely logging in on the basis of the user ID of the output-permitted user U1 having entered the detectable region A1.

Note that the log-in processing section 19 can collate the user ID and the password input from the operation panel 6 with those stored in the ROM 30 and can perform the log-in authentication of the output-permitted user U1. Furthermore, the log-in processing section 19 receives the user information from the ID card including radio frequency identification (RFID) to which the user information is registered to thereby be able to perform the log-in authentication. Moreover, when the user determination section 18 determines that the user in the detectable region A1 is the other user U2 on the basis of the user information received by the wireless communication section 35 from the terminal device 4 held by the other user U2, the log-in processing section 19 can also perform the log-in authentication of the other user U2.

The image forming control section 20 starts up the image forming section 10 to thereby perform control for causing the image forming section 10 to form an image, through the print interface 43, on the basis of the print job acquired by the job acquisition section 16. The image forming control section 20 compares the user distance L1 received from the user detection section 17 with the start-up distance D2 calculated by the start-up distance-calculating section 25. Then, the image forming control section 20 controls whether or not printing according to the print job is started on the basis of a result of the comparison.

For example, when the output-permitted user U1 subjected to log-in authentication by log-in processing section 19 reaches the start-up region A2 specified by the start-up distance D2 where the image forming units 8Y, 8M, 8C, and 8K start to form the image, the image forming control section 20 causes the image forming units 8Y, 8M, 8C, and 8K to perform the security job J1 issued by the output-permitted user U1. On the other hand, when the other user U2 issues the normal job J2, the image forming control section 20 causes the image forming units 8Y, 8M, 8C, and 8K to perform the normal job J2 without the log-in authentication by the log-in processing section 19. Here, the image forming control section starts up the image forming section 10 to thereby start warming-up before causing the image forming units 8Y, 8M, 8C, and 8K to form the image. For example, when the image forming section 10 is in a power saving mode, the temperature of a roller section of the fixing section 13 is lowered. Accordingly, the image forming control section 20 changing into an image forming mode starts up the image forming section 10 in advance to thereby warm up the roller section of the fixing section 13 and to be able to perform the image forming processing on the sheet.

The other user notifying section 21 notifies the other user U2 present near the image forming apparatus 2 that the output-permitted user U1 log-in authenticated by the log-in processing section 19 reaches (logs in) the start-up region A2. The notification is indicated as, for example, a time until the output-permitted user U1 logs in on the display section 42 of the operation panel 6. The time until the output-permitted user U1 logs in may be a time obtained by the other user notifying section 21 from a moving speed of the output-permitted user U1 calculated by a moving speed calculating section 27. Furthermore, the time until the output-permitted user U1 logs in may be a predetermined time (for example, five seconds) stored in the ROM 30.

Figure 10:
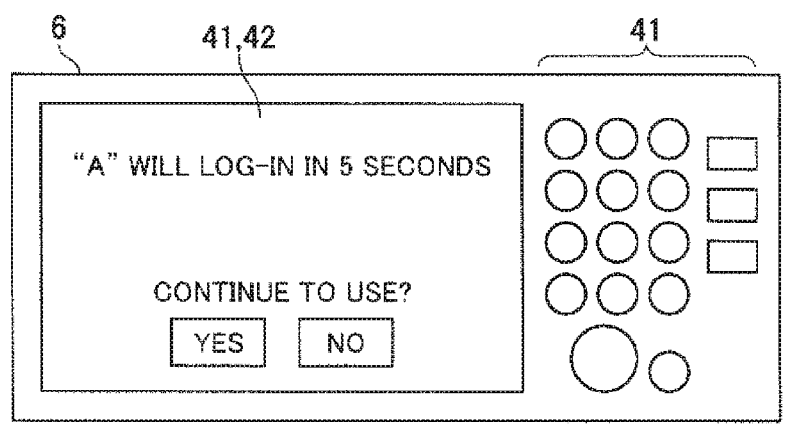
FIG. 10 is a diagram of a user interface illustrating a display example of a screen for selecting use condition displayed on an operation panel of the image forming apparatus according to the embodiment of the present invention.

Before the output-permitted user U1 that has entered the detectable region A1 reaches the start-up region A2, the use condition input section 22 prompts the other user U2 present near the image forming apparatus 2 (own apparatus) detected by the user detection section 17 to input use condition. The use condition of the image forming apparatus 2 may include, for example, cases or the like where the other user U2 continues to use the image forming apparatus 2, and the other user U2 stops using the image forming apparatus 2. The other user U2 notices that the output-permitted user U1 having issued the security job J1 is approaching the image forming apparatus 2, by the change in display content on the display section 42 of the operation panel 6 or by light emission of a lump. As illustrated in FIG. 10 described below, the other user U2 presses a selection button displayed on the display section 42 of the operation panel 6 to thereby input the use condition indicating whether or not the other user U2 continues to use the image forming apparatus 2. Note that, when the user detection section 17 does not detect the other user U2 near the image forming apparatus 2 (own apparatus), the use condition input section 22 does not prompt the other user U2 to input the use condition. In that case, the display content on the display section 42 of the operation panel 6 does not change, or the lump does not emit light.

When the other user U2 present near the image forming apparatus 2 (own apparatus) detected by the user detection section 17 is using the image forming apparatus 2, an output-permitted user notifying section 23 notifies the output-permitted user U1 of information indicating that the other user U2 is using the image forming apparatus 2. As the information indicating that the other user U2 is using the image forming apparatus 2, for example, pressing-down information generated when the other user U2 presses an operation button, the use condition of the image forming apparatus 2 (own apparatus) input by the other user U2 through the operation panel 6, and the like are used.

The use condition of the image forming apparatus 2 notified by the output-permitted user notifying section 23 is indicated as a message on the screen of the terminal device 4 held by the output-permitted user U1. The output-permitted user U1 checks the use condition of the image forming apparatus 2 notified from the output-permitted user notifying section 23 to thereby determine whether or not to go to get the printed matter to the image forming apparatus 2, or return to his own place. Note that the output-permitted user U1 can be notified of the use condition of the image forming apparatus 2, by: a lump that is mounted in the image forming apparatus 2 and emits light in a specified color indicating that the other user U2 continues to use the image forming apparatus 2; an audio guide released from the terminal device 4; vibration or light emission of the terminal device 4; and the like.

A post processing control section 24 starts up the post processing device FN to thereby cause the post processing device FN to perform a predetermined post processing on the print matter, on the basis of a job type set for the print job determined by a job type determination section 26. The job type refers to one in which a type of a job (for example, post processing) that is performed on the sheet (printed matter) on which the image is formed, is set for the print job.

The image forming apparatus 2 starts up, and then, the start-up distance-calculating section 25 (example of processing start distance-calculating section) calculates the start-up distance D2 for starting the image forming processing. The start-up distance D2 for specifying the start-up region A2 is a value calculated by the start-up distance-calculating section 25 on the basis of the post processing performed by the post processing device FN, and is calculated on the basis of the job type determined by the job type determination section 26. When the start-up distance-calculating section 25 calculates the start-up distance D2, the number-of-jobs- and distance-converting table Ta1 or the job type-and distance-converting table Ta2 stored in the ROM 30 stored in the ROM 30 is referred to. The start-up distance D2 calculated by the start-up distance-calculating section 25 is stored in the RAM 31.

The job type determination section 26 determines the job type set for the print job acquired by the job acquisition section 16.

The moving speed calculating section 27 calculates speed at which the output-permitted user U1 detected by the user detection section 17 moves in the detectable region A1. For example, the user detection section 17 calculates the user distance L1 with reference to the radio-wave strength-and distance-converting table Ta3 on the basis of the strength of the radio wave transmitted from the terminal device 4 and measured for every one second by the wireless communication section 35, and then, outputs the user distance L1 to the moving speed calculating section 27. In addition, the moving speed calculating section 27 calculates the moving speed of the output-permitted user U1 on the basis of a variation amount of the user distance L1 for every one second.

FIG. 5 illustrates a configuration of the number-of-jobs- and distance-converting table Ta1.

The number-of-jobs-and distance-converting table Ta1 (example of a second converting table) manages a relationship between the number of sheets (the number of jobs) set for the print job and the start-up distance D2 where the image forming apparatus 2 starts up for each of the number of jobs, in association with each other. The number-of-jobs- and distance-converting table Ta1 has the number of jobs indicating the number of sheets set for the job, and field of the start-up distance indicating a distance where the image forming apparatus 2 starts up.

In addition, the start-up distance-calculating section 25 defines, as the start-up distance D2, the start-up distance acquired from the number-of-jobs- and distance-converting table Ta1 on the basis of the number of jobs set for the print job. For example, when the number of jobs for the print job is "one", the start-up distance-calculating section 25 determines the start-up distance D2 to be "0.5 m". Furthermore, when the number of jobs for the print job is "two", the start-up distance-calculating section 25 determines the start-up distance D2 to be "1 m". The reason why the longer start-up distance D2 is set for the more number of the jobs is that the longer time is needed for operation processing of the control section 15 for the more number of jobs and the time for forming the image on a first sheet takes longer, and thereby timing for ejecting the first sheet is delayed.

FIG. 6 illustrates a configuration of the job type- and distance-converting table Ta2.

The job type-and distance-converting table Ta2 (example of a first converting table) illustrated in FIG. 6A is a table for managing a relationship between the job type set for the print job and the start-up distance where the image forming apparatus 2 starts up, in association with each other. In addition, the job type-and distance-converting table Ta2 stores the start-up distance specified for each post processing. The job type-and distance-converting table Ta2 has each field of management numbers for identifiably managing the post processing of the post processing device FN, the job types indicating the types of the post processing performed by the post processing device FN, and the start-up distance indicating the distance for starting up the image forming apparatus 2. The job type- and distance-converting table Ta2 is used in order that the start-up distance-calculating section 25 may calculate the shortest start-up distance D2 to be used so that the start-up distance-calculating section 25 does not impair the security.

In addition, the start-up distance-calculating section 25 determines, as the start-up distance D2, a total value of the start-up distances acquired from the job type- and distance-converting table Ta2 on the basis of the job type set for the print job. For example, when a plurality of job types is included in the security job J1, the start-up distance-calculating section 25 determines, as the start-up distance D2, the total value of the start-up distance acquired from the job type- and distance-converting table Ta2 for each job type.

For example, the record listed at the top of the job type- and distance-converting table Ta2 indicates that the sheet folding device FN1 corresponding to the management number "FN1" executes the job type of the "sheet folding" processing, and the start-up distance is "2 m". Furthermore, the record listed at the second top indicates that the cutting device FN2 corresponding to the management number "FN2" executes the job type of the "cutting" processing, and the start-up distance is "1 m". Moreover, the record listed at the third top indicates that the stapling device FN3 corresponding to the management number "FN3" executes the job type of the "stapling" processing, and the start-up distance is "0.5 m". In addition, the record listed at the fourth top indicates that the bookbinding device FN4 corresponding to the management number "FN4" executes the job type of the "bookbinding" processing, and the start-up distance is "3 m".

When the present embodiment is defined as a basic mode, the start-up distance-calculating section 25 extends the calculated start-up distance D2 to thereby further reduce the user's waiting time, in consideration of other modes on which complicated folding processing and bookbinding processing are performed.

FIGS. 6B to 6D illustrate combination examples of the job types.

As illustrated in FIG. 6B, in a case where the post processing is performed using the post processing device FN by a combination of four job types, the post processing includes combination of "sheet folding", "cutting", "stapling", and "bookbinding" processing.

As illustrated in FIG. 6C, in a case where the post processing is performed using the post processing device FN by a combination of three job types, the post processing includes combination of the three types of post processing selected from among the four types thereof, which are "sheet folding", "cutting", "stapling", and "bookbinding" processing.

As illustrated in FIG. 6D, in a case where the post processing is performed using the post processing device FN by a combination of two job types the post processing includes combination of the two types of post processing selected from among the four types thereof, which are "sheet folding", "cutting", "stapling", and "bookbinding" processing.

Then, the start-up distance-calculating section 25 calculates, as the start-up distance D2, a total distance obtained by totaling the start-up distances when the post processing acquired by combining job types illustrated in FIGS. 6B to 6D with reference to the job type-and distance-converting table Ta2 is performed.

Note that, when only one post processing is provided by the post processing device FN, the start-up distance illustrated in FIG. 6A is used as the start-up distance D2 as it is. Furthermore, when the post processing is not performed by the post processing device FN, the start-up distance D2 is calculated on the basis of processing illustrated in step S24 illustrated in FIG. 9 described below. Moreover, the start-up distance-calculating section 25 may calculate, as the start-up distance D2, the total distance acquired by totaling the start-up distance in the number-of-jobs- and distance-converting table Ta1 illustrated in FIG. 5 and the start-up distance in the job type-and distance-converting table Ta2.

Figure 7:
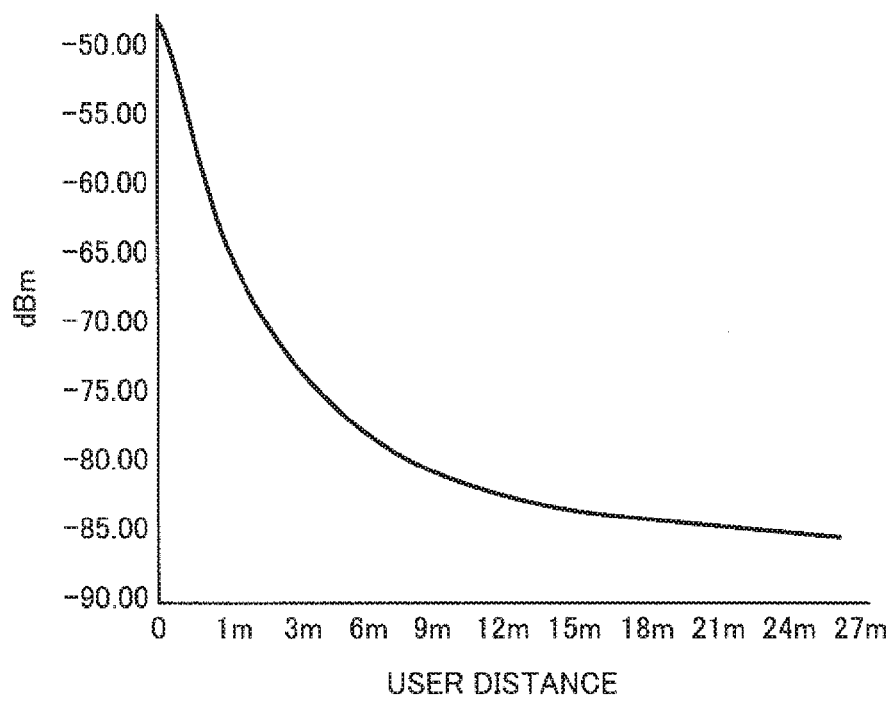
FIG. 7 is a characteristic diagram indicating a relationship between a user distance and strength of a radio wave according to the embodiment of the present invention.

FIG. 7 is a characteristic diagram indicating a relationship between the user distance L1 and the strength of the radio wave.

According to the characteristic diagram illustrated in FIG. 7, it is indicated that the strength of the radio wave received from the terminal device 4 by the wireless communication section 35 corresponds to the user distance L1. The relationship between the user distance L1 and the strength of the radio wave illustrated in FIG. 7 is stored in the ROM 30 as the radio-wave strength- and distance-converting table Ta3.

When the wireless communication section 35 receives the radio wave from the terminal device 4 held by the output-permitted user U1 having entered the A1, the section 35 measures the strength of the radio wave and outputs the strength thereof to the user detection section 17. The user detection section 17 converts the strength of the radio wave input from the wireless communication section 35 into the user distance L1, with reference to the radio-wave strength- and distance-converting table Ta3 stored in the ROM 30. With this arrangement, the user detection section 17 can obtain the user distance L1 from the image forming apparatus 2 (own apparatus) to the output-permitted user U1.

Note that the user detection section 17 can obtain the user distance up to the other user U2, and detect the other user U2 present near the image forming apparatus 2 by a human feeling sensor or the like.

<Processing Example of Image Forming Apparatus>

Subsequently, a processing example of the image forming apparatus 2 will be described with reference to FIGS. 8 and 9.

Figure 8:
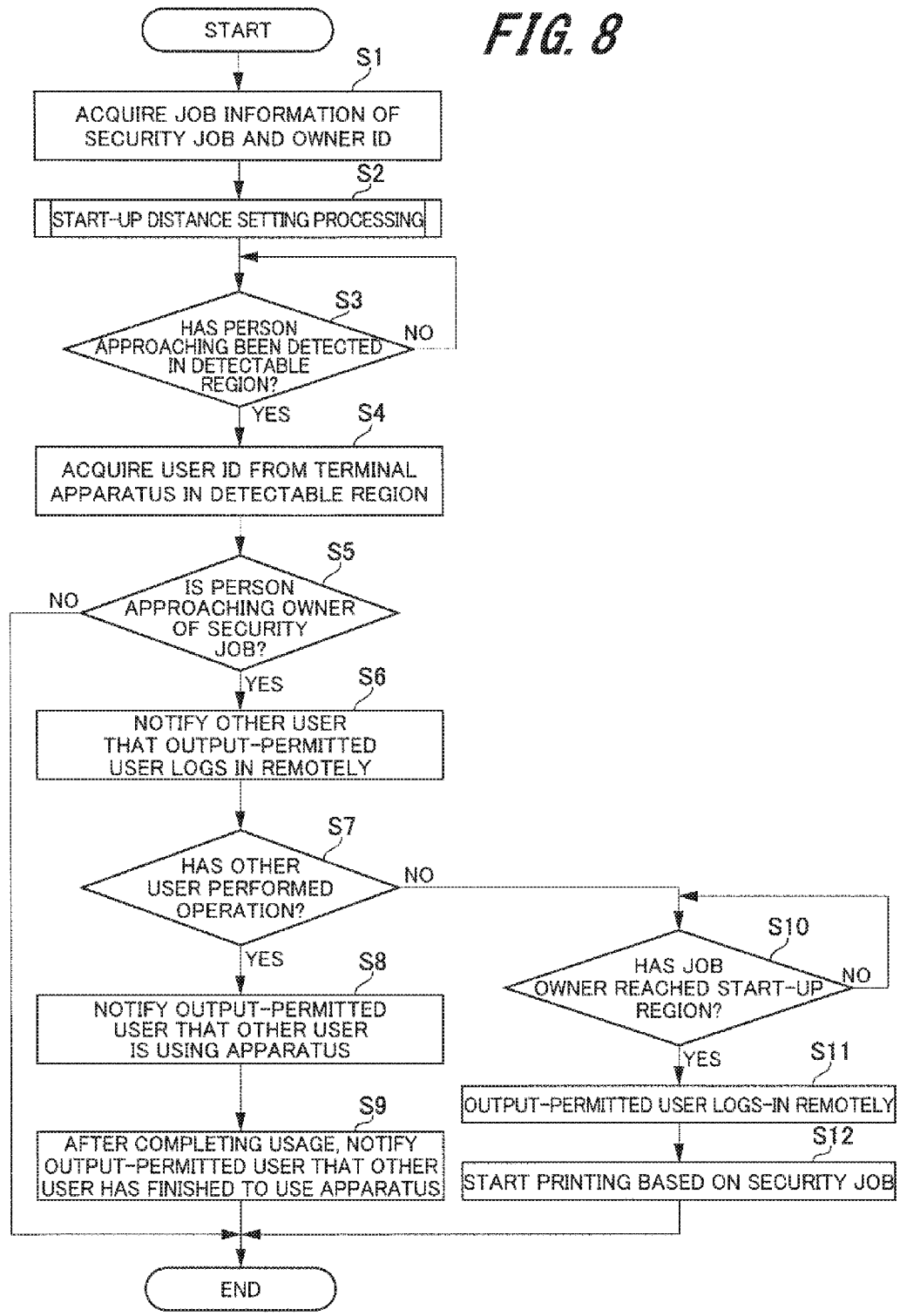
FIG. 8 is a flowchart illustrating a processing example of the image forming apparatus according to the embodiment of the present invention.

FIG. 8 is a flowchart illustrating the processing example of the image forming apparatus 2.

Figure 9:
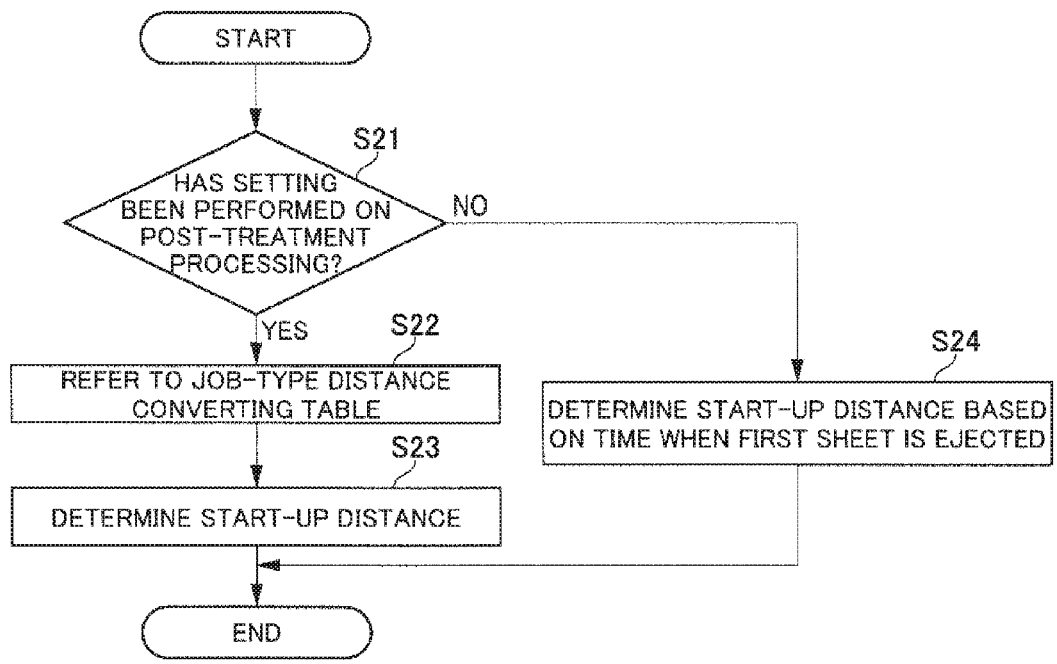
FIG. 9 is a flowchart illustrating an example of processing for setting a start-up distance in step S2 illustrated in FIG. 8.

FIG. 9 is a flowchart illustrating an example of setting processing of the start-up distance D2 in step S2 of FIG. 8.

Here, a case will be described as an example in which the output-permitted user U1 operates the pc terminal P1 to transmit one security job J1 to the image forming apparatus main body 3. Note that the processing is performed even during the power saving mode.

First, when the security job J1 being acquired from the PC terminal P1, the job acquisition section 16 acquires job information from the security job J1 and an owner ID of an owner of the security job J1 (S1). The job information of the security job J1 includes information indicating the job type of the security job J1, information indicating the number of sheets (the number of jobs) set for the security job J1, and information indicating a type of image (image type) set for the security job J1.

Next, the start-up distance-calculating section 25 performs the start-up distance-setting processing with reference to the job type of the security job J1 acquired in step S1 and the job type- and distance-converting table Ta2 (refer to FIG. 6) (S2). In the start-up distance-setting processing, the start-up distance D2 of the image forming apparatus 2 (the image forming apparatus main body 3 and the post processing device FN) is set.

Here, the setting processing of the start-up distance D2 will be described with reference to FIG. 9.

First, the start-up distance-calculating section 25 determines whether or not the post processing is set for the security job J1 acquired in step S1 of FIG. 8 (S21). Here, with reference to the job type of the security job J1, the start-up distance-calculating section 25 determines that the post processing is set when at least one of the sheet folding processing, the cutting processing, the stapling processing, and the bookbinding processing is set for the security job J1. When the start-up distance-calculating section 25 determines that the post processing is not set for the security job J1 (NO in S21), the start-up distance D2 is determined on the basis of the time when the first sheet (first print) is ejected (S24), and the processing proceeds to step S3 of FIG. 8.

On the other hand, in step S21, when the start-up distance-calculating section 25 determines that the post processing is set (YES in S21), the processing proceeds to step S22. If the post processing is set for the security job J1, the start-up distance-calculating section 25 can calculate the start-up distance D2 with reference to the job type-and distance-converting table Ta2.

Next, the start-up distance-calculating section 25 refers to the job type of the security job J1 acquired in step S1 and the job type-and distance-converting table Ta2 (refer to FIG. 6) (S22), and the start-up distance-calculating section 25 determines the start-up distance D2 (S23), and the process proceeds to step S3 illustrated in FIG. 8. For example, the start-up distance-calculating section 25 determines the start-up distance D2 to be "2 m" in a case where the job type of the security job J1 acquired in step S1 is "sheet folding". Furthermore, the start-up distance-calculating section 25 determines the start-up distance D2 to be "1 m" in a case where the job type of the security job J1 acquired in step S1 is "cutting".

The start-up distance-calculating section 25 stores, in a table form, the start-up distance D2 determined by the start-up distance-setting processing in step S2 in the RAM 31, in association with the management number of the security job J1 and the owner ID of the security job J1.

Note that the start-up distance-calculating section 25 determines the start-up distance D2 by adding all start-up distances D2 set for each job type in a case where two or more job types are set for the security job J1 acquired in step S1. For example, the start-up distance-calculating section 25 determines the start-up distance D2 to be "2 m+1 m=3 m" in a case where the job type of the security job J1 acquired in step S1 is "sheet folding" and "cutting".

As described above, a printed matter on which the post processing is to be performed by the post processing device FN is not caught by the eyes of other persons, the security can be ensured. Focusing on the point described above in the present embodiment, the time required for the post processing is converted into the start-up distance D2, and when the output-permitted user U1 reaches the start-up region A2 specified with the start-up distance D2, the image forming apparatus 2 starts up to thereby start the print processing. As described above, the start-up distance-calculating section 25 sets the start-up distance D2 to thereby be able to enhance user convenience while maintaining the security.

FIG. 8 will be described again.

After processing in step S2, the udder detection section 17 determines whether or not an approaching person (user) in the detectable region A1 has been detected (S3). At this time, the udder detection section 17 detects the approaching person (user) by using the radio wave transmitted from the terminal device 4 existing in the detectable region A1. Here, the detectable region A1 refers to a region where the wireless communication section 35 can receive the radio wave transmitted from the terminal device 4, and the region is 10 m, for example. The wireless communication section 35 receives the radio wave transmitted from the terminal device 4 existing in the detectable region A1 to thereby be able to detect the user holding the terminal device 4.

Subsequently, the user determining section 18 acquires the user ID transmitted from the terminal device 4 existing in the detectable region A1 on the basis of the user information extracted from the radio wave received by the wireless communication section 35 (S4). In addition, the user determining section 18 determines whether or not the approaching person is the owner of the security job J1 on the basis of the owner ID of the owner of the security job J1 acquired in step S1 and the user ID acquired in step S4 (S5). Specifically, the user determining section 18 determines that it is the owner of the security job J1 in a case where the owner ID of the owner of the security job J1 acquired in step S1 coincides with the user ID acquired in step S4.

In a case where the user determining section 18 determines that the approaching person is the owner of the security job J1 (YES in S5), the processing proceeds to step S6. On the other hand, when the user determining section 18 determines that the approaching person is not the owner of the security job J1 (NO in S5), the processing is completed.

After YES is determined in step S5, the other user notifying section 21 notifies the other user U2 present near the image forming apparatus 2 of the fact that the approaching person remotely logs in (S6). It is displayed as a message on the display section 42 of the operation panel 6 as illustrated in FIG. 10 described below that the approaching person remotely logs in.

Subsequently, the use condition input section 22 determines whether or not the other user U2 has performed any operation on the operation panel 6 (S7). When any operation is performed, an operation signal indicating that any operation is performed on the operation panel 6 is output from an operation section 41 to the use condition input section 22, and thus the use condition input section 22 can determine whether or not the other user U2 has operated the operation panel 6. The use condition input section 22 outputs determined operation content, namely, intention of use continuation, to the output-permitted user notifying section 23.

Note that, in step S7, in the processing in which the use condition input section 22 determines whether or not the other user U2 performs any operation, an operation for setting the document on an automatic document feeder (ADF) 5 by the other user U2, an operation for pressing an operation switch belonging to the image forming apparatus 2, and the like, may be a target to be determined in place of an operation on the operation panel 6.

Furthermore, as described with reference to FIG. 10 below, when the use condition input section 22 displays a selection button for inputting whether or not the other user U2 continues to use the image forming apparatus 2 on the display section 42 of the operation panel 6, the processing in step S7 may be changed so as to determine whether or not the other user U2 has selected and input "YES" or "NO" of the selection button.

When the use condition input section 22 determines that the other user U2 has performed the operation (YES in step S7), the output-permitted user notifying section 23 notifies the terminal device 4 held by the output-permitted user U1 that the other user U2 is using the image forming apparatus 2 through the wireless communication section 35 (S8). In addition, after the other user U2 has completed the use of the image forming apparatus 2, in step S9, the output-permitted user notifying section 23 notifies the terminal device 4 that the other user U2 has completed the use of the image forming apparatus 2. At the time point, the output-permitted user U1 has possibility of going out of the detectable region A1 and returning to his or her place. Accordingly, the output-permitted user notifying section 23 may notify the PC terminal P1 that the use of the image forming apparatus 2 has been completed through the network N by the network controller 34.

On the other hand, when the use condition input section 22 determines that the other user U2 does not perform the operation (NO in S7), it is considered that the other user U2 does not continue to use the image forming apparatus 2, namely, the other user U2 has stopped using the image forming apparatus 2. At this time, the user U2 separates away from the image forming apparatus 2. Accordingly, the output-permitted user U1 causes the image forming apparatus 2 to perform the processing based on the security job J1.

In step S10, the user detection section 17 reads out the start-up distance D2 set in step S2 from the RAM 31, and the output-permitted user U1 having been determined to be the owner (job owner) of the security job J1 in step S5 determines whether or not the output-permitted user U1 has reached the start-up region A2 specified by the start-up distance D2. At this time, the user detection section 17 acquires the strength of the radio wave transmitted from the terminal device 4 held by the output-permitted user U1 determined to be the owner of the security job J1 through the wireless communication section 35. The user detection section 17 calculates, with reference to the radio-wave strength-and distance-converting table Ta3, the user distance L1 for the acquired strength of the radio wave to thereby determine whether or not the output-permitted user U1 has reached the start-up region A2.

When it is determined that the output-permitted user U1 has reached the start-up region A2 (YES in S10), the log-in processing section 19 performs the remote log in of the output-permitted user U1 (S11).

On the other hand, when it is determined that the output-permitted user U1 has not reached the start-up region A2 (NO in S10), the user detection section 17 repeatedly makes a determination in step S10 every predetermined time.

When the output-permitted user U1 remotely logs in step S11, the image forming control section 20 makes the image forming section 10 start the image forming processing based on the security job J1 acquired in step S1 (S12). When the post processing is set for the security job J1, the post processing control section 24 starts the post processing of the post processing device FN based on the security job J1. Subsequently, the output-permitted user U1 reaches the image forming apparatus 2 and can acquire the printed matter ejected onto the document receiving tray 14.

<Display Example on Selection Screen of Use Condition>

FIG. 10 is an a user interface diagram indicating a display example on a selection screen for the use condition displayed on the operation panel 6 of the image forming apparatus 2.

The other user notifying section 21 notifies the other user U2 that the output-permitted user U1 is approaching the image forming apparatus 2 (own apparatus) while the user determination section 18 determines that the user detected by the user detection section 17 is the output-permitted user U1. For example, the other user notifying section 21 can notify the other user U2 that the output-permitted user U1 is approaching the image forming apparatus 2 (own apparatus) while the output-permitted user U1 is present in the detectable region A1 and still has not reached the start-up region A2. Then, a selection screen of the use condition displayed on the display section 42 of the operation panel 6 displays the time until the output-permitted user U1 (for example, A) remotely logs in, and the selection button for selecting and inputting the intention of the other user U2 (for example, B) continuing to use the image forming apparatus 2.

The time until the output-permitted user U1 remotely logs in, namely, the remaining time until the output-permitted user U1 reaches the start-up region A2 is obtained by the other user notifying section 21 as described above from the moving speed of the output-permitted user U1 calculated by the moving speed calculating section 27, and then, the other user U2 is notified of the time. Furthermore, the selection button includes two types of a YES button indicating that the other user U2 continues to use the image forming apparatus 2, and a NO button indicating stop of using the image forming apparatus 2. The output-permitted user notifying section 23 transmits the intension of use continuation of the image forming apparatus 2 having been selected and input with the YES button or the NO button by the other user U2, to the terminal device 4 held by the output-permitted user U1.

Note that the other user notifying section 21 may notify the other user U2 that the log-in processing section 19 performs the log-in authentication on the output-permitted user U1, and may also notify the other user U2 of the information about the print job issued by the output-permitted user U1 (for example, the number of prints, the number of print pages, the printing completion time). Furthermore, the other user notifying section 21 does not display the selection screen on an entire face of the operation panel 6 as illustrated in FIG. 10, but may display the selection screen adjacent to a screen for executing the copy function, the scanning function and the like which the other user U2 is working on.

<Display Example of Use Condition>

FIG. 11 is a user interface diagram indicating a display example of the use condition of the image forming apparatus 2 displayed on the display of the terminal device 4.

Figure 11A:
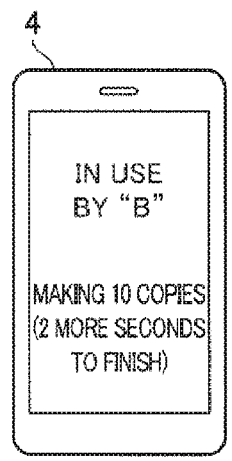
FIG. 11A is a diagram of a user interface illustrating a first display example of use condition of the image forming apparatus displayed on a display of a terminal device according to the embodiment of the present invention.

FIG. 11A illustrates a first display example of the use condition of the image forming apparatus 2, when the other user U2 selects and inputs the YES button indicating use continuation of the image forming apparatus 2. The output-permitted user notifying section 23 notifies the output-permitted user U1 of the information about other print job issued by the other user U2. Accordingly, the output-permitted user U1 recognizes that the other user U2 is using the image forming apparatus 2. Furthermore, as the information about the print job, FIG. 11A illustrates that the print job executed by the other user U2 makes ten copies of materials and it takes two minutes to complete execution of the print job. Therefore, the output-permitted user U1 can effectively utilize the time until the image forming apparatus 2 becomes available, for example, by once returning to his place and by finishing other works.

Figure 11B:
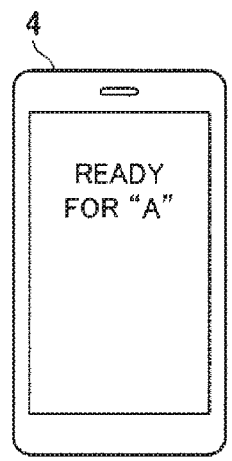
FIG. 11B is a diagram of a user interface illustrating a second display example of use condition of the image forming apparatus displayed on the display of the terminal device according to the embodiment of the present invention.

FIG. 11B illustrates a second display example of the use condition of the image forming apparatus 2 when the other user U2 selects and inputs the NO button indicating a use stop of the image forming apparatus 2. At this time, the output-permitted user notifying section 23 notifies the output-permitted user U1 that the other user U2 has completed using the image forming apparatus 2. In this case, since the other user U2 separates away from the vicinity of the image forming apparatus 2, the output-permitted user U1 can acquire the printed matter printed on the basis of the security job J1 at a time point when reaching the image forming apparatus 2.

The use condition of the image forming apparatus 2 illustrated in FIG. 11B may be notified to the output-permitted user U1, after the print job (including copy and scanning) executed by the image forming apparatus 2 is completed and it is detected that the other user U2 is not present near the image forming apparatus 2. With this arrangement, the output-permitted user U1 can know that the other user U2 has completed using the image forming apparatus 2, and can safely acquire the printed matter on which the image is formed on the basis of the security job J1, by approaching the image forming apparatus 2.

According to the image forming apparatus 2 of the one embodiment described above, since the output-permitted user U1 is notified of the use condition of the image forming apparatus 2 by the other user, the output-permitted user U1 issuing the security job J1 and approaching the image forming apparatus 2, before reaching the image forming apparatus 2, can determine whether or not the output-permitted user U1 can use the image forming apparatus 2. Then, if the output-permitted user U1 knows that the image forming apparatus 2 is not available (for example, other user U2 is using), he or she can make determination of returning to his place, or using other image forming apparatus 2 as soon as possible. Furthermore, the output-permitted user U1 can grasp how long he or she needs to wait until the image forming processing of the print job issued by himself or herself is completed. Accordingly, the output-permitted user U1 can reduce the waiting time for waiting for ejection of the printing matter based on the security job J1 in front of the image forming apparatus 2.

Furthermore, if the other user U2 is in preparation (for example, in preparation for copy document) near the image forming apparatus 2, the other user U2 is notified of the fact that the output-permitted user U1 is approaching the image forming apparatus 2. Therefore, the other user U2 can express the intension of using the image forming apparatus 2 (for example, pressing the button of the panel, log-in operation using the IC card) and can stop the output-permitted user U1 from approaching. With this arrangement, there can be prevented a case where the output-permitted user U1 approaching the image forming apparatus 2 squeezes in with the remote log in to thereby cause the other user U2 not to be able to use the image forming apparatus 2. Accordingly, the generation of an unnecessary waiting time for the other user U2 can be suppressed. Furthermore, if the other user U2 is not using the image forming apparatus 2, the other user U2 separates away from the image forming apparatus 2, and thus there can be reduced a possibility that the other user U2 looks at the sheet or takes it away even when the sheet on which the image forming processing based on the print job issued by the output-permitted user U1 is ejected.

Furthermore, focusing on the fact that timing for impairing the security differs depending on the job type or the number of jobs, the start-up distance-calculating section 25 calculates the start-up distance D2 where the output is started before the output-permitted user U1 reaches the image forming apparatus 2. At this time, with reference to the job type of the security job J1, the start-up distance-calculating section 25 sets the D2 according to the post processing set for the security job J1. At this point, with reference to the number-of-jobs- and distance-converting table Ta1 and the job type-and distance-converting table Ta2, the start-up distance-calculating section 25 sets the start-up distance D2 that does not impair the security regardless of whether or not the other user U2 is present near the image forming apparatus 2.

Moreover, when the post processing is not set for the security job J1, the start-up distance-calculating section 25 sets the start-up distance D2 on the basis of time when the first sheet is ejected. Therefore, regardless of whether or not the post processing is set for the security job J1, the image forming apparatus 2 can complete the print processing at the timing when the output-permitted user U1 that is the owner of the security job J1 reaches the image forming apparatus 2. Accordingly, it is possible to reduce the waiting time of the output-permitted user U1 while ensuring the security of the printed matter after being ejected.

[Modification]

According to the embodiment described above, the post processing device FN is assumed to include four post processing devices (sheet folding device FN1, cutting device FN2, stapling device FN3, and bookbinding device FN4), but the invention is not limited to those. Namely, the number of the post processing devices has no limitation, and the number may be one or two or more. Furthermore, the post processing device FN may be constituted integrally with the image forming apparatus main body 3.

In addition, the use condition input section 22 may prompt the other user U2 present near the image forming apparatus 2 to input the use condition, by lighting up the light button mounted on the image forming apparatus 2. In this case, the other user U2 may input a state where the image forming apparatus 2 is being used, by pressing the light button.

Furthermore, in the embodiment described above, the user detection section 17 detects the output-permitted user U1 and a position of the output-permitted user U1 (distance to the output-permitted user U1) on the basis of the strength of the radio wave of the terminal device 4 received by the wireless communication section 35, but the present invention is not limited to the detection. For example, in place of using the terminal device 4, an image capturing section such as a camera is provided on the image forming apparatus main body 3, and the user detection section 17 may detect the output-permitted user U1 and the position of the output-permitted user U1 on the basis of the image captured by the image capturing section. In this case, the user determination section 18 can also identify the output-permitted user U1 by recognizing a face or the like of the output-permitted user U1 on the basis of the image captured by the image capturing section.

Furthermore, the start-up distance-calculating section 25 may acquire the time necessary until the image forming apparatus 2 starts up in a sleep mode that needs more time than in the power saving mode as the processing start time for starting a series of processing by the image forming apparatus 2. On the basis of the processing start time, the time may be used as one example of the processing start distance-calculating section that calculates the processing start distance. Moreover, when the image forming apparatus 2 sequentially performs the print processing by the print job, the image forming apparatus 2 does not move into the power saving mode. If it does not move into the power saving mode, for example, a fixing section 13 of the image forming section 10 continues to be heated up and, thus, the temperature is not lowered. Therefore, the start-up time of the image forming apparatus 2 may be shorter than that of the image forming apparatus 2 that has moved into the power saving mode. In this case, the start-up distance-calculating section 25 may shorten the start-up distance of each job type stored in the job type-and distance-converting table Ta2 to calculate the start-up distance D2.

Furthermore, when the image forming apparatus 2 is surrounded by shielding such as a partition and a wall, it is considered that shapes of the A1 and the start-up region A2 are transformed from a substantially circular shape illustrated in FIGS. 1 and 2. Even in this case, the image forming apparatus 2 can detect the output-permitted user U1 that has entered a transformed detectable region A1, and start the print processing on the basis of the security job J1 when the output-permitted user U1 enters a transformed start-up region A2.

Furthermore, one or a plurality of a wireless communication sections 35 is provided outside the image forming apparatus main body 3, and on the basis of the strength of the received signal of the radio wave received by an outside wireless communication section 35, the user detection section 17 may correctly detect approaching of the terminal device 4 (output-permitted user U1).

Note that it should be understood that the description set forth herein is not intended to limit the present invention, and encompasses various types of applications and modifications within a scope not departing from the gist of the present invention.

For example, the above-mentioned embodiments describe the configurations of the apparatus and the system in detail and specifically for better understanding of the present invention, and they do not necessarily include all configurations described herein. Furthermore, a part of the configurations of the embodiment set forth herein can be replaced with configurations of other embodiments, and furthermore, configurations of other embodiment can be added to those of the other embodiment. Moreover, a part of the configuration of each embodiment can be added, deleted, and replaced from other configuration.

In addition, control lines and information lines are indicated for better understanding, and thus all of them are not indicated for all products. Actually, almost configurations may be considered to be mutually connected.

REFERENCE SIGNS LIST 1 image forming system
2 image forming apparatus
3 image forming apparatus main body
4 terminal device
10 image forming section
14 document receiving tray
15 control section
16 job acquisition section
17 user detection section
18 user determination section
19 log-in processing section
20 image forming control section
21 other-user notifying section
22 use condition input section
23 output-permission user notifying section
24 post processing control section
25 start-up distance-calculating section
26 FN post processing device

What is claimed is:

1. An image forming apparatus comprising:
an image forming unit which forms an image on a sheet based on a print job issued from a communication terminal operated by a user; and
a hardware processor which is configured to execute operations including:
acquiring the print job;
detecting the user present in a detectable region;
determining whether the user is an output-permitted user having issued the print job or is an other user other than the output-permitted user;
causing the image forming unit to form the image based on the print job in a case in which the output-permitted user has reached a processing start region where the image forming unit becomes capable of starting forming the image; and
notifying a terminal device of the output-permitted user of information indicating that the other user is using the apparatus in a case in which the other user is present near the apparatus and is using the apparatus,
wherein the hardware processor notifies the other user that the output-permitted user is approaching the apparatus, prompts the other user to input a use condition of the apparatus before the output-permitted user having entered the detectable region reaches the processing start region, and notifies the output-permitted user of the use condition of the apparatus.

2. The image forming apparatus according to claim 1, wherein the hardware processor notifies the other user that the output-permitted user has reached the processing start region.

3. The image forming apparatus according to claim 1, wherein the hardware processor notifies the output-permitted user that the other user has finished using the apparatus.

4. The image forming apparatus according to claim 1, wherein the hardware processor notifies the other user of information about the print job.

5. The image forming apparatus according to claim 1, wherein the hardware processor notifies the output-permitted user of information about another print job issued by the other user.

6. The image forming apparatus according to claim 1, wherein the hardware processor notifies the other user that the output-permitted user is approaching the apparatus while determining that the output-permitted user is present in the detectable region and still has not reached the processing start region.

7. The image forming apparatus according to claim 1, wherein the hardware processor does not prompt the other user to input the use condition in a case in which the output-permitted user is not detected near the apparatus.

8. The image forming apparatus according to claim 1, wherein the hardware processor calculates a moving speed of the output-permitted user, calculates a remaining time until the output-permitted user reaches the processing start region based on the moving speed, and notifies the other user of the remaining time.

9. An image forming apparatus comprising:
an image forming unit which forms an image on a sheet based on a print job issued from a communication terminal operated by a user;
a post processing device which performs post processing on the sheet on which the image is formed; and
a hardware processor which is configured to execute operations including:
acquiring the print job;
detecting the user present in a detectable region;
determining whether the user is an output-permitted user having issued the print job or is an other user other than the output-permitted user;
causing the image forming unit to form the image based on the print job in a case in which the output-permitted user has reached a processing start region where the image forming unit becomes capable of starting forming the image; and
notifying a terminal device of the output-permitted user of information indicating that the other user is using the apparatus in a case in which the other user is present near the apparatus and is using the apparatus,
wherein the hardware processor is set for the print job, determines a job type indicating the post processing to be performed on the sheet, and calculates a processing start distance for specifying the processing start region based on the job type.

10. The image forming apparatus according to claim 9, wherein the hardware processor acquires the job type and the processing start distance based on a first conversion table storing the processing start distance for each of a plurality of types of the post processing, and totals processing start distances in a case in which the print job includes a plurality of the job types.

11. The image forming apparatus according to claim 9, wherein the hardware processor acquires the number of jobs set for the print job and the processing start distance based on a second conversion table storing the processing start distance for each of the number of jobs.

12. A notification method comprising:

acquiring, by a hardware processor included in an image forming apparatus, a print job issued from a communication terminal operated by a user;

detecting, by the hardware processor, the user present in a detectable region;

determining, by the hardware processor, whether the user is an output-permitted user having issued the print job or is an other user other than the output-permitted user;

causing, by the hardware processor, the image forming unit to perform image formation based on the print job in a case in which the output-permitted user has reached a processing start region where an image forming unit which forms an image on a sheet based on the print job becomes capable of starting forming the image;

notifying, by the hardware processor, a terminal device of the output-permitted user of information indicating that the other user is using the apparatus in a case in which the other user is present near the apparatus and is using the apparatus;

notifying, by the hardware processor, the other user that the output-permitted user is approaching the apparatus;

prompting the other user to input a use condition of the apparatus before the output-permitted user having entered the detectable region reaches the processing start region; and notifying the output-permitted user of the use condition of the apparatus.

13. The notification method according to claim 12, further comprising notifying, by the hardware processor, the other user that the output-permitted user has reached the processing start region.

14. The notification method according to claim 12, further comprising notifying, by the hardware processor, the output-permitted user that the other user has finished using the apparatus.

15. The notification method according to claim 12, further comprising notifying, by the hardware processor, the other user of information about the print job.

16. The notification method according to claim 12, further comprising notifying, by the hardware processor, the output-permitted user of information about another print job issued by the other user.

17. A nontransitory computer readable medium encoded with a program to cause an image forming apparatus to execute the notification method of claim 12.

* * * * *